(12) United States Patent
Nie et al.

(10) Patent No.: US 10,171,467 B2
(45) Date of Patent: Jan. 1, 2019

(54) DETECTION OF AUTHORIZATION ACROSS SYSTEMS

(71) Applicant: International Business Machines Corporation, Armonk, NY (US)

(72) Inventors: Lei Nie, Xian (CN); Chun Lei Xu, Xian (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/215,755

(22) Filed: Jul. 21, 2016

(65) Prior Publication Data

US 2018/0026955 A1    Jan. 25, 2018

(51) Int. Cl.
*H04L 9/32* (2006.01)
*H04L 29/06* (2006.01)

(52) U.S. Cl.
CPC .................................. *H04L 63/10* (2013.01)

(58) Field of Classification Search
None
See application file for complete search history.

(56) References Cited

U.S. PATENT DOCUMENTS

| | | | |
|---|---|---|---|
| 8,621,589 B2 | 12/2013 | Chen et al. | |
| 2003/0229812 A1 | 12/2003 | Buchholz | |
| 2005/0154913 A1 | 7/2005 | Barriga et al. | |
| 2008/0072301 A1 | 3/2008 | Chia et al. | |
| 2009/0119763 A1* | 5/2009 | Park | H04L 63/0815 726/8 |
| 2009/0293108 A1* | 11/2009 | Weeden | G06F 21/41 726/6 |
| 2010/0262703 A1* | 10/2010 | Faynberg | H04L 63/0815 709/229 |
| 2014/0013409 A1 | 1/2014 | Halageri | |

FOREIGN PATENT DOCUMENTS

| | | |
|---|---|---|
| CA | 2488881 A1 | 8/2004 |
| CN | 104301418 A | 1/2015 |

OTHER PUBLICATIONS

Disclosed Anonymously et al., "Distributed Cross System Authorization", IP.com Prior Art Database Technical Disclosure, IP.com No. IPCOM000241740D, IP.com Electronic Publication Date: May 27, 2015, 6 pages.

* cited by examiner

*Primary Examiner* — David Le
(74) *Attorney, Agent, or Firm* — Gilbert Harmon, Jr.

(57) ABSTRACT

Example embodiments of the present disclosure provide methods, devices, and computer programs for authorization detection. The first system receives, from the second system unauthorized by the first system, a request for operating a resource of the first system. The first system causes a detection of an authorization chain to be detected based on the first record that at least indicates one or more systems that are authorized by the first system. The authorization chain includes at least a third system that authorizes the second system and is authorized by the first system. If the authorization chain is detected, the first system authorizes the operation of the resource of the first system.

20 Claims, 4 Drawing Sheets

DETECTION OF AUTHORIZATION ACROSS SYSTEMS

BACKGROUND OF THE INVENTION

The invention relates generally to resource access authentication, and more specifically, to resource access authentication based on cross-system authentication.

Currently, personal data of individual users can be stored on many different platforms such as cloud storage, personal blogs, social communities, instant messaging systems, and the like. Likewise, computing ability can be deployed on various platforms. As a result, a single user can own storage and computing resources provided by different providers. However, due to authorization issues, it is difficult to consolidate these resources to work together smoothly. For example, if a user wants to back up the articles he/she publishes on a blog platform onto his/her cloud storage space, manual operations are needed because the blog and cloud storage platforms provided by different operators have separate authorizations that must be provided to different validation systems.

SUMMARY

Example embodiments of the present disclosure provide a method, a device, and a computer program for authorization detection.

In a first aspect, a computer-implemented method is provided. The method comprises steps of: receiving, at a first system and from a second system unauthorized by the first system, a request for operating a resource of the first system; and in response to an authorization chain being detected based on a first record, authorizing the operation of the resource of the first system, the authorization chain including at least a third system that authorizes the second system and is authorized by the first system, the first record at least indicating one or more systems that are authorized by the first system to operate resources of the first system.

In a second aspect, a computer-implemented method is provided. The method comprises steps of: receiving, at a third system and from a first system, an inquiry associated with a second system that is unauthorized by the first system, the third system being authorized by the first system; and in response to receiving the inquiry, sending to the first system a result of a determination as to whether the second system is authorized by the third system, the determination being made based on the second record at least indicating one or more systems that are authorized by the third system to operate resources of the third system.

In a third aspect, a device is provided. The device includes a processing unit and a memory coupled to the processing unit and storing instructions thereon, the instructions, when executed by the processing unit, performing acts including: receiving, at a first system and from a second system unauthorized by the first system, a request for operating a resource of the first system; and in response to an authorization chain being detected based on a first record, authorizing the operation of the resource of the first system, the authorization chain including at least a third system that authorizes the second system and is authorized by the first system, the first record at least indicating one or more systems that are authorized by the first system to operate resources of the first system.

In a fourth aspect, a device is provided. The device includes a processing unit and a memory coupled to the processing unit and storing instructions thereon, the instructions, when executed by the processing unit, performing acts including: receiving, at a third system and from a first system, an inquiry associated with a second system that is unauthorized by the first system, the third system being authorized by the first system; and in response to receiving the inquiry, sending to the first system a result of a determination as to whether the second system is authorized by the third system, the determination being made based on the second record at least indicating one or more systems that are authorized by the third system to operate resources of the third system.

In a fifth aspect, a computer program product is provided. The computer program product is tangibly stored on a non-transient machine-readable medium and comprising machine-executable instructions, the instructions, when executed on a device, causing the device to perform the steps of the method according to the first and/or second aspects.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION

Embodiments of the present invention will now be described with reference to the figures. It is to be understood that these embodiments are described only for the purpose of illustration and assist one skilled in the art to understand and implement the present embodiments, without suggesting any limitations as to the scope of the embodiments. It should be noted that the embodiments described herein can be implemented in various manners other than the ones described below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
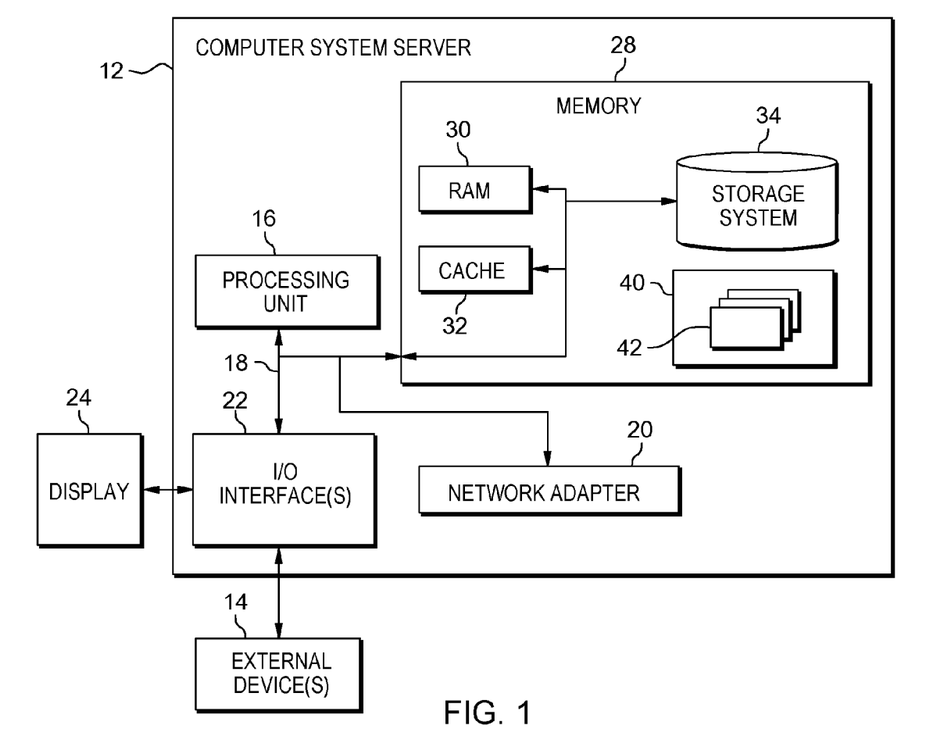
FIG. 1 is a block diagram of an electronic device suitable for implementing embodiments of the present disclosure.

Reference is first made to FIG. 1, in which an exemplary electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
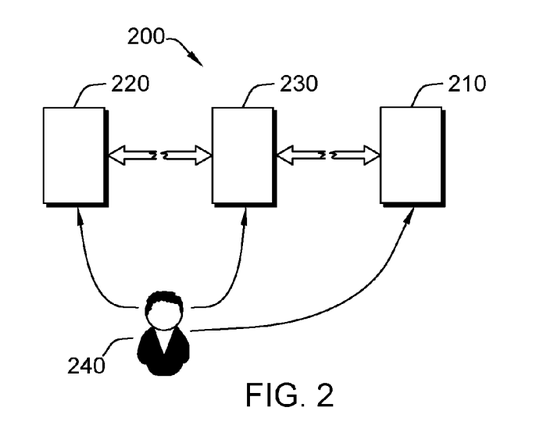
FIG. 2 is a block diagram of an example environment in accordance with embodiments of the present disclosure.

Now some example embodiments of the present disclosure will be described. FIG. 2 shows a schematic diagram of an environment 200 for authorization detection. The environment 200 includes several systems including a first system 210, a second system 220, and a third system 230. The first, second and third systems 210230 can be any suitable systems that are accessible to a user 240. Examples of the systems 210-230 include, but are not limited to, cloud storage systems, personal blog systems, social community systems, instant messaging systems, and the like. It is to be understood that the number of the systems as shown in FIG. 2 are only for the purpose of illustration without suggesting any limitation of the present disclosure. Any other numbers of the systems are possible.

In the environment 200, a user 240 owns resources provided by the three systems 210-230. Examples of these resources of the systems 210-230 include, but are not limited to, one or more of the following: computing resources, such as the type, number and frequency of available central processing units (CPUs); storage resources, such as the type, number and size of available memories and disks; input/output (I/O) resources, such as the type, number and graphics acceleration capabilities of available graphics processing units (GPUs); network resources, such as the supported network communication type and available bandwidth; user data stored or maintained at the respective systems, such as the user's backup data, blogs, articles, contact information, or the like.

As described above, from the perspective of the user 240, a user can consolidate the resources of these systems 210-230 to work together. For example, in the case that the three systems 210-230 are respectively implemented as a big data analytics system, a personal blog system, and a cloud storage system, the user 240 can decide to back up the articles he/she publishes on the blog platform in the second system 220, such as the personal blog system, onto his/her cloud storage space in the third system 230, such as the cloud storage system. As another example, the user 240 can decide to get from the first system 210, such as the big data analytics system, an article analytics report about his/her articles published on the blog platform in the second system 210.

In this situation, the second system 220 can initiate both a backup task on the third system 230 and an article analytics task on the first system 210. At this point, the second system 220 will request to use the resources owned by the user 240 on the first and third systems 210 and 230. However, as described above, due to the lack of a cross-system authorization mechanism, it is difficult for the second system 220 to operate the resources of the first and third systems 210 and 230. Although single sign-on (SSO) can be used across systems, SSO works on the basis of the user's input and participation. Moreover, SSO needs a central server reduces the robustness of SSO. Further, the scope of SSO is fixed in advance and therefore lacks flexibility. In addition, the involved systems have to discard their original authorization mechanism and rely on an external SSO server.

For example, in order to overcome the above and other potential deficiencies, according to embodiments of the present disclosure, it is assumed that the third system 230 is authorized by the first system 210 while the second system 220 is not authorized by the first system 210. As used herein, the term "authorization" refers to a permission of operation or usage of the resources. For example, in the case that the third system 230 is authorized by the first system 210, the third system 230 is allowed to operate the resources hosted by the first system 210. It is to be understood that the authorization is usually specific to individual users. That is, when the user 240 logs onto the third system 230 which is authorized by the first system 210, the first system 210 can permit the third system 230 to operate the resources of the first system 210 owned by that user 240. In this way, the data owned by other users remains secure.

Further, it is assumed that the second system 220 requests to operate a resource of the first system 210. In response, the first system 210 can determine whether there is an "authorization chain" between the first and second systems 210 and 220. The authorization chain includes one or more other systems such as the third system 230, where an upstream system in the authorization chain authorizes a downstream system. The authorization chain represents "indirect" authorization. For example, if it is determined that the second system 220 is authorized by the third system 230, there is an authorization chain between the first and second systems 210 and 220 that includes the third system 230. In this case, the second system 220 is "indirectly" authorized by the first system 210. As a result, the second system 220 can automatically trigger operations of the resources of the first system 210, without user participation or pre-configuration.

Figure 3:
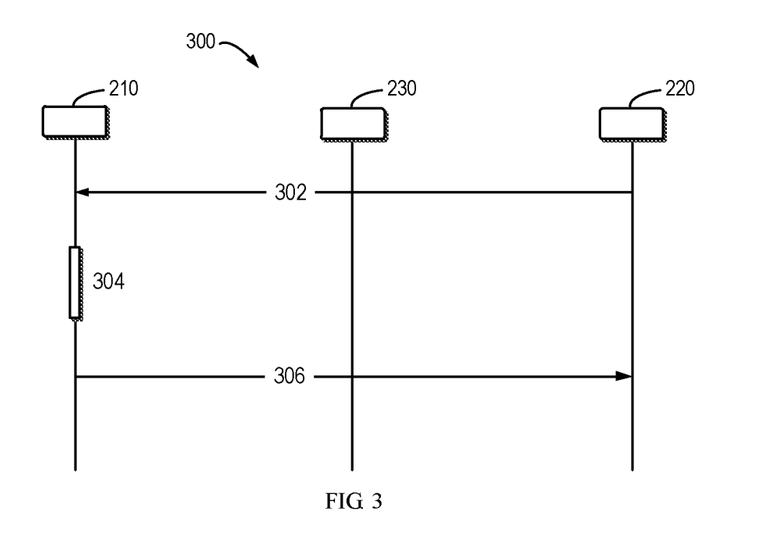
FIG. 3 is an example diagram of authorizing a second system unauthorized by a first system to operate a resource of the first system in accordance with one embodiment of the present disclosure.

FIG. 3 shows an example diagram 300 of a process for authorizing the second system 220 unauthorized by the first system 210 to operate a resource of the first system 210 in accordance with embodiments of the present disclosure. The diagram 300 can be implemented in the environment 200 as shown in FIG. 2. As shown, according to embodiments of the present disclosure, the first system 210 receives (302) from the second system 220 a request for operating a resource of the first system 210. The request can be received by the first system 210 in response to any suitable event where the second system 220 needs to trigger the operation of the resource of the first system 210. For example, as described above, in the case that the first system 210 is implemented as a big data analytics system and the second system 220 is implemented as a personal blog system, the user 240 may want to get from the first system 210 an article analytics report about the articles he/she publishes on the blog platform in the second system 220. In this event, in order to trigger an article analytics task on the first system 210, the second system 220 can send to the first system 210 the request for operating the related resources of the first system 210.

Upon receipt (302) of the request, the first system 210 causes (304) a detection of an authorization chain including at least a system that authorizes the second system 220 and is authorized by the first system 210. It is assumed there is an authorization chain between the first and second systems 210 and 220 which is composed of the third system 230 (not shown). This authorization chain indicates that the third system 230 is authorized by the first system 210, and the second system 220 is authorized by the third system 230.

It is to be understood that in the context of the present disclosure, the authorization between systems can include direct and/or indirect authorization. For example, the authorization of the first system 210 to the third system 230 can include direct or indirect authorization of the first system 210 to the third system 230. The direct authorization of the first system 210 to the third system 230 indicates that the third system 230 is directly authorized by the first system 210 without any intermediate system. The indirect authorization of the first system 210 to the third system 230 indicates that, although the third system 230 is directly unauthorized by the first system 210, there is an authorization chain including at least a further system that authorizes the third system 230 and is authorized by the first system 210.

In general, the authorization chain is detected based on a record which will be referred to as "first record" for the purpose of discussion. In some embodiments, the first record is accessible to the first system 210 and the detection can be performed by the first system 210. It is to be understood that the first record can be stored locally at the first system 210. Alternatively, or in addition, at least a part of the first record can be stored remotely from the first system 210, and the first system 210 is able to access the first record. The first record at least indicates one or more systems that are authorized by the first system 210. Thus, the first system 210 can detect the authorized third system 230 by searching the first record. Then the first system 210 can detect whether the requesting second system 220 is authorized by the third system 230. This can be done in a variety of ways and example embodiments will be discussed in the following paragraphs with reference to FIGS. 4-6.

Alternatively, in other embodiments, the first record can be maintained at a third-party machine, for example, a centralized server. In these embodiments, the first sever can trigger the detection by requesting the third-party machine to determine whether there is an authorization chain, and then receive the detection result from the third-party machine. In the following, the principle of authorization chain detection will be discussed with reference to the embodiments where the first system 210 performs the detection by itself. However, it is to be understood that those principles apply to embodiments where the third-party machine instead detects the authorization chain.

Still in reference to FIG. 3, if an authorization chain between the first and second systems 210 and 220 that includes the third system 230 is detected (304), as shown in FIG. 3, the first system 210 authorizes (306) the second system 220 to operate its resources. Otherwise, the request will be denied if no authorization chain is detected. In this way, even if the second system 220 is unauthorized by the first system 210, the second system 220 may obtain the authorization of operating the resource of the first system 210. As a result, resources of different systems can be effectively and efficiently consolidated to work together smoothly.

Figure 4:
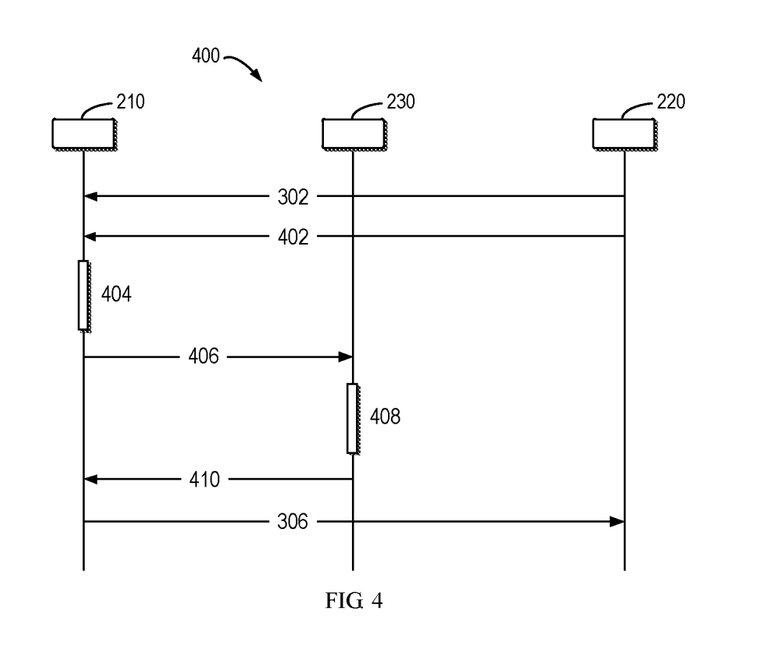
FIG. 4 is an example diagram of detecting an authorization chain including a third system in accordance with one embodiment of the present disclosure.

FIG. 4 shows an example diagram 400 of detecting the authorization chain in accordance with one embodiment of the present disclosure. The diagram 400 can be considered as an example implementation of the diagram 300 as shown in FIG. 3.

In this example, as shown, in addition to the request for operating the resource of the first system 210 received (302) from the second system 220, the first system 210 further receives (402) an identification of the third system 230 from the second system 220. That is, in such embodiments, the second system 220 may also inform the first system 210 of one or more systems (including the third system 230 in this case) that authorizes the second system 220. Any suitable information specific to the third system 230 can be used as the identification such as, but not limited to, account information of the user 240 on the third system 230, the unique code/machine name of the third system 230, or the like. It should be understood that any other implementations of the identification are possible.

The identification of the third system 230 can be sent along with or separately from the request for resource. For example, in one embodiment, the identification of the third system 230 can be encapsulated in the request. In this embodiment, the receiving operations 302 and 402 can be completed in one shot. Then the first system 210 can extract or otherwise obtain the identification from the request.

Upon receipt (402) of the identification of the third system 230, the first system 210 determines (404) whether the third system 230 is authorized by searching the received identification of the third system 230 locally in the first record stored at the first system 210. As described above, the first record at least indicates one or more systems that are directly or indirectly authorized by the first system 210. These authorized systems can be identified in the first record, for example, by the respective identification and/or other suitable information. By way of example, user account information associated with the systems can act as the identifications of the systems. In other words, the identifications serve as authorization information of the systems. It should be appreciated that this is merely for illustration without suggesting any limitations as to the scope of the present disclosure. The first record can contain any suitable alternative or additional information as the authorization information.

In this example, after the user 240 account information of the third system 230 is received (402) as the identification of the third system 230, the first system 210 can search the first record for the user 240 account information of the third system 230. That is, the first system 210 checks whether the identification of the third system 230 is contained in the first record. If so, it means that the third system 230 is authorized by the first system 210. Otherwise, failure of the identification of the third system 230 in the first record indicates that the third system 230 is not authorized by the first system 210. In this way, the first system 210 is able to determine (404) whether the third system 230 is authorized by the first system 210.

If the identification of the third system 230 is found in the first record, then it can be determined that the third system 230 is authorized by the first system 210. In this case, the first system 210 detects whether the second system 220 is authorized by the third system 230. More particularly, in the examples as shown in FIG. 4, the first system 210 sends (406) an inquiry to the third system 230 to determine whether the second system 220 is authorized by the third system 230. The inquiry can include the identification of the second system 220, for example.

Upon receipt of the inquiry from the first system 210, the third system 230 causes a determination (408) to be made as to whether the second system 220 is authorized. The determination can be made based on a record which is referred to as "second record." Similar to the first record, the second record at least indicates one or more systems that can be authorized by the third system 230 and can be implemented in a similar fashion as described above. Accordingly, with reference to the first system 210, the third system 230 can determine whether the second system 220 is an authorized system by searching the second record for the identification of the second system 220. If the identification of the second system 220 is found in the second record, the third system 230 determines that the second system 220 is authorized by the third system 230.

It is to be understood that the features described with reference to the first record are also applicable to the second record. For example, if the second record is accessible to the third system 230, the third system 230 may directly determine whether the second system 220 is authorized. Otherwise, in those embodiments where the second record is separately maintained by a third-party machine, the third system 230 can cause the determination to be made by sending a request to the third party machine and receiving the result therefrom.

The authorization for the second system 220, as determined at the third system 230, can include direct or indirect authorization as well, as described above. For example, if the identification of the system 220 is not found in the second record, it can be determined that there is no direct authorization for the second system 220. In this situation, the third system 230 can detect the indirect authorization for the second system 220, for example, by detecting an authorization chain including at least a system (referred to as "fourth system" which is not shown) that authorizes the second system 220 and is authorized by the third system 230. The detection of the fourth system by the third system 230 is similar to the detection of the third system 230 by the first system 210 and will not be repeated herein.

If it is determined that the second system 220 is authorized, directly or indirectly, by the third system 230, the third system 230 can send (410) a response to the first system 210 to indicate the result of the determination (408). If the response indicates that the second system 220 is authorized by the third system 230, the first system 210 authorizes (306) the second system 220 to operate its resource.

Figure 5:
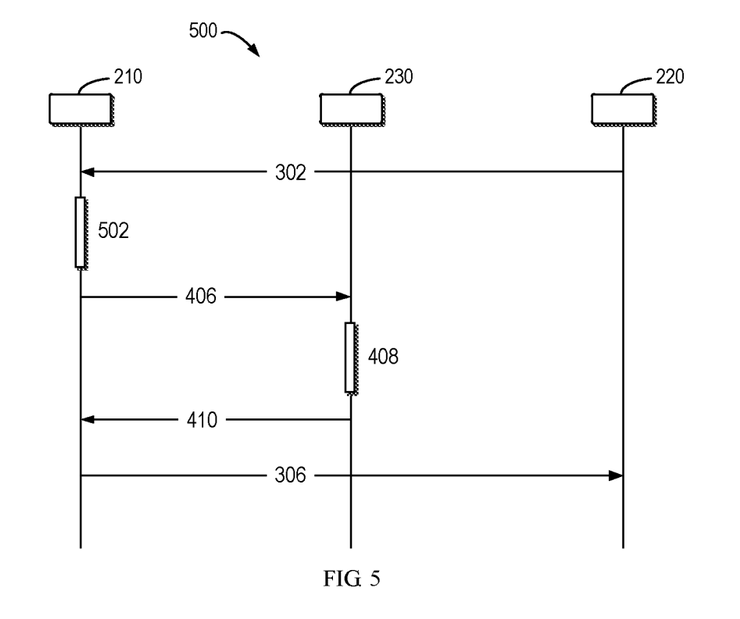
FIG. 5 is an example diagram of detecting an authorization chain including a third system in accordance with another embodiment of the present disclosure.

FIG. 5 shows an example diagram 500 of detecting the authorization chain in accordance with another embodiment of the present disclosure. The diagram 500 can be considered as another example implementation of the diagram 300 as shown in FIG. 3. Unlike the diagram 400, in the embodiments shown in FIG. 5, the second system 220 does not send the identification of the third system 230 to the first system 210. Instead, after receiving (302) from the second system 220 the request for operating the resource of the first system 210, the first system 210 determines (502) an authorized system (assumed to be the third system 230 for the sake of discussion) by searching the first record. The first system 210 detects whether the second system 220 is authorized by the third system 230 as determined from the first record.

Similar to the embodiments as shown in diagram 400, the detection of the second system 220 can be implemented by inquiring the third system 230. As shown, the first system 210 sends (406) an inquiry to the third system 230 to determine whether the second system 220 is authorized by the third system 230. Then, the first system 210 receives (504) a response to the inquiry sent (410) from the third system 230. If the response indicates that the second system 220 is authorized by the third system 230, the first system 210 authorizes (306) the second system 220 to operate its resource. Otherwise, the request is denied.

In the above embodiments, the authorization chain is detected at least by sending one or more inquiries from the first system 210 to the third system 230 which is authorized by the first system 210. Alternatively, or in addition, in some embodiments the detection of the authorization chain can be done locally at the first system 210 in order to reduce communication overhead. In these embodiments, in addition to the systems authorized by the first system 210, the first record further indicates the authorization information for these authorized systems. That is, for each authorized system, the first record indicates one or more further systems that are authorized by that system.

Figure 6:
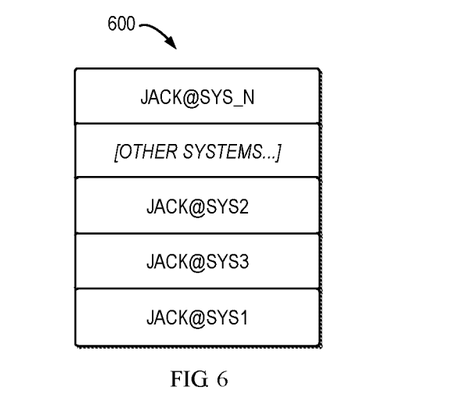
FIG. 6 is an example list included in a first record for use in detection of the authorization chain according to one embodiment of the present disclosure.

The authorization information of associated systems can be stored in the first record in any suitable form. For example, the first record can include lists of the associated systems. FIG. 6 shows an example list 600 included in the first record according to one embodiment of the present disclosure. The list 600 illustrates authorization information related to the first system 210 in the form of an authorization chain of the associated systems. In the list 600, these systems are identified by the associated user accounts. It is to be understood that the first record may include any number of lists related to the first system 210 each of which indicates an authorization chain of a set of systems associated with the first system 210.

As shown, the authorization chain in the list 600 indicates that the third system 220 is authorized by the first system 210, and the second system 220 is authorized by the third system 230. Accordingly, by searching the first record for authorization information indicating that the second system 220 is authorized by the third system 230, the first system 210 can determine the authorization of the third system 230 to the second system 220. For the purpose of discussion, the authorization information indicating the authorization of the third system 230 to the second system 220 will be referred to as first authorization information.

In some embodiments, the first record may also include authorization information (referred to as "second authorization information") indicating that the first system 210 is authorized by the third system 230. In these embodiments, in order to prevent forming a loop in detecting the authorization chain including the third system 230, the first system 210 may cause the second authorization information to be removed from the first record. For example, the first system 210 may remove the second authorization information if the first record is maintained by or otherwise accessible to the first system 210. Alternatively, the first system 210 may request the third-party machine maintaining the first record to remove the second authorization information. This would save storage resource and improve accuracy of the authorization chain detection. Likewise, the records at other systems (for example, the second record) can be processed in a similar fashion to remove redundant authorization information.

In order to maintain comprehensive authorization information of the associated systems, in some embodiments, in addition to the authorization information related to the first system 210, the first record can also indicate authorization information associated with other systems, such as the second and third systems 220 and 230. In this way, efficiency of the searching performed by the first system 210 can be further improved.

The authorization information included in the records at individual systems can be maintained and updated in any suitable manner. In one embodiment, the first system 210 can receive from the user 240 a user input and then updates the first record based on the user input. For example, the user 240 may specify authorization relationship between some systems. After receiving the user input associated with the specified authorization relationship, the first system 210 can update the first record accordingly. In this way, contrary to the SSO mechanism where the authorization relationships are fixed in advance, embodiments of the present disclosure provide more flexibility based on dynamic authorization relationships.

In another embodiment, the first system 210 can receive one or more further records from one or more further systems, such as the second record from the third system 230. Then the first system 210 may cause the first record to be updated based on the received record(s). Alternatively, or in addition, the first system 210 can cause the first record to be provided to one or more other systems such as the third system 230, such that the third system 230 can obtain comprehensive authorization information of the associated systems and update its own record. It should be appreciated that the first system 210 can send the first record by itself, or request the third-party machine on which the first record is maintained to provide the first record to the third system 230.

Figure 7:
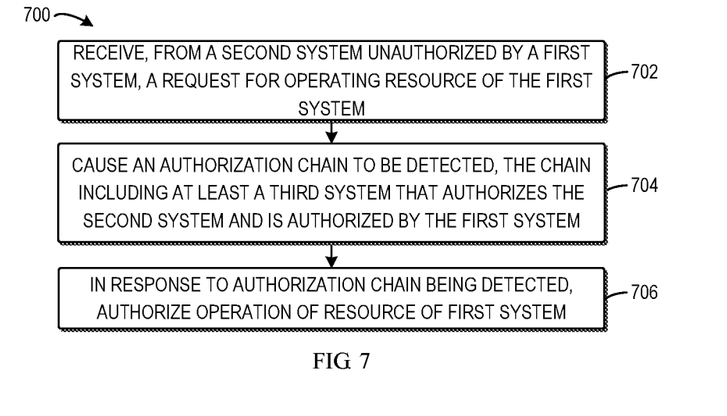
FIG. 7 is a flowchart of an example computer-implemented method according to one embodiment of the present disclosure.

FIG. 7 shows a flowchart of an example computer-implemented method 700 according to one embodiment of the present disclosure. The method 700 can be carried out by the first system 210 as shown in FIG. 2. In step 702, the first system 210 receives, from the second system 220 unauthorized by the first system 210, a request for operating a resource of the first system 210. In step 704, the first system 210 causes an authorization chain to be detected based on the first record, wherein the authorization chain includes at least the third system 230 authorizing the second system 220 and being authorized by the first system 210. The first record at least indicates systems that are authorized by the first system 210. Then, in step 706, in response to the authorization chain being detected, the first system 210 authorizes the operation of the resource of the first system 210.

In one embodiment, the detecting an authorization chain can comprise: receiving, from the second system, an identification of the third system; determining whether the third system is authorized by the first system by searching the first record for the identification of the third system; in response to determining that the third system is authorized by the first system, detecting whether the second system is authorized by the third system. In one embodiment, the detecting an authorization chain can comprise: obtaining, from the first record, a system authorized by the first system as the third system; and detecting whether the second system is authorized by the third system. In one embodiment, the detecting an authorization chain can comprise: sending to the third system an inquiry to determine whether the second system is authorized by the third system; and receiving from the third system a response to the inquiry, the response indicating whether the second system is authorized by the third system. In one embodiment, the first record can include authorization information indicating further systems authorized by the systems that are authorized by the first system. Furthermore, the detecting an authorization chain can comprise: searching the first record for first authorization information indicating that the second system is authorized by the third system; and in response to finding the first authorization information in the first record, determining that the second system is authorized by the third system. In one embodiment, the method 700 can further comprise: in response to determining that the first record further includes second authorization information indicating that the first system is authorized by the third system, removing the second authorization information from the first record. In one embodiment, the method 700 can further comprise: receiving a user input; and updating the first record based on the received user input. In one embodiment, the method 700 can further comprise: causing the first record to be provided at least one of the systems that are authorized by the first system.

Figure 8:
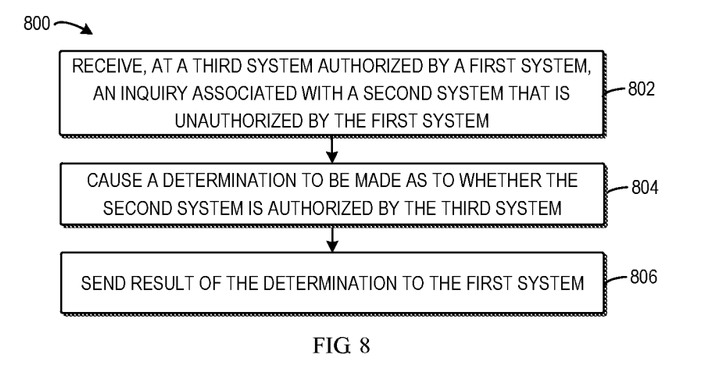
FIG. 8 is a flowchart of an example computer-implemented method according to another embodiment of the present disclosure.

FIG. 8 shows a flowchart of an example computer-implemented method 800 according to another embodiment of the present disclosure. The method 800 can be carried out by the third system 230 as shown in FIG. 2. In step 802, the third system 230 receives from the first system 210 an inquiry associated with the second system 220 that is unauthorized by the first system 210. The third system 230 is authorized by the first system 210. In step 804, the third system 230 causes a determination to be made as to whether the second system 220 is authorized by the third system 230. This determination is made based on the second record which at least indicates systems that are authorized by the third system 230. Then, in step 806, the third system 230 sends a result of the determination to the first system 210 as a response to the inquiry.

In one embodiment, the determining whether the second system is authorized by the third system can comprise: receiving an identification of the second system from the first system; searching the second record for the identification of the second system; and in response to finding the identification of the second system in the second record, determining that the second system is authorized by the third system. In one embodiment, the determining whether the second system is authorized by the third system further can comprise: in response to missing the identification of the second system in the second record, detecting, based on the second record, an authorization chain including at least a fourth system authorizing the second system and being authorized by the third system. In one embodiment, the second record can include authorization information indicating further systems authorized by the systems that are authorized by the third system. Furthermore, the method 800 can further comprise: in response to determining that the second system is authorized by the third system, searching the second record for third authorization information indicating that the third system is authorized by the second system; and in response to finding the third authorization information, removing the third authorization information from the second record. In one embodiment, the method 800 can further comprise: receiving a first record from the first system, the first record at least indicating systems that are authorized by the first system.

It is to be understood that all operations and features described above with reference to FIGS. 3-6 are likewise applicable to the methods 700 and 800 and have similar effects. For the purpose of conciseness, the details are omitted.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, at a first system and from a second system unauthorized by the first system, a request for operating a resource of the first system;
in response to an authorization chain being detected based on a first record, authorizing the operation of the resource of the first system, the authorization chain including at least a third system that authorizes the second system and is authorized by the first system, the first record at least indicating one or more systems that are authorized by the first system to operate resources of the first system wherein a record associated with the authorization chain is updated, based on a user input, creating a dynamic authorization relationship.

2. The method of claim 1, further comprising causing the authorization chain to be detected by:
receiving, from the second system, an identification of the third system;
determining whether the third system is authorized by the first system based on searching the identification of the third system in the first record;
in response to determining that the third system is authorized by the first system, detecting whether the second system is authorized by the third system.

3. The method of claim 1, further comprising causing the authorization chain to be detected by:
obtaining, from the first record, a system authorized by the first system as the third system; and
detecting whether the second system is authorized by the third system.

4. The method of claim 1, further comprising causing the authorization chain to be detected by:
sending to the third system an inquiry to determine whether the second system is authorized by the third system; and
receiving from the third system a response to the inquiry, the response indicating whether the second system is authorized by the third system.

5. The method of claim 1, wherein the first record includes authorization information indicating further one or more systems authorized by the one or more systems that are authorized by the first system, the method further comprising causing the authorization chain to be detected by:
searching the first record for first authorization information indicating that the second system is authorized by the third system; and
in response to finding the first authorization information in the first record, determining that the second system is authorized by the third system.

6. The method of claim 1, wherein the first record includes authorization information indicating further one or more systems authorized by the one or more systems that are authorized by the first system, the method further comprising:
in response to determining that the first record includes second authorization information indicating that the first system is authorized by the third system, causing the second authorization information to be removed from the first record.

7. The method of claim 1, further comprising:
updating the first record based on the received user input.

8. The method of claim 1, further comprising:
causing the first record to be provided to at least one of the one or more systems that are authorized by the first system.

9. A computer-implemented method comprising:
receiving, at a third system and from a first system, an inquiry associated with a second system that is unauthorized by the first system, the third system being authorized by the first system; and
in response to receiving the inquiry, sending to the first system a result of a determination as to whether the second system is authorized by the third system, the determination being made based on a second record at least indicating one or more systems that are authorized by the third system to operate resources of the third system wherein a record associated with an authorization chain is updated, based on a user input, creating a dynamic authorization relationship.

10. The method of claim 9, further comprising determining whether the second system is authorized by the third system by:
receiving an identification of the second system from the first system;
searching the identification of the second system in the second record; and
in response to finding the identification of the second system in the second record, determining that the second system is authorized by the third system.

11. The method of claim 10, further comprising determining whether the second system is authorized by the third system by:
in response to missing the identification of the second system in the second record, detecting, based on the second record, an authorization chain including at least a fourth system authorizing the second system and being authorized by the third system.

12. The method of claim 9, wherein the second record includes authorization information indicating further one or more systems authorized by the one or more systems that are authorized by the third system, the method further comprising:
in response to a determination that the second system is authorized by the third system, searching the second record for third authorization information indicating that the third system is authorized by the second system; and
in response to finding the third authorization information, causing the third authorization information to be removed from the second record.

13. The method of claim 9, further comprising:
receiving a first record from the first system, the first record at least indicating one or more systems that are authorized by the first system to operate resources of the first system.

14. A device comprising:
a processing unit;
a memory coupled to the processing unit and storing instructions thereon, the instructions, when executed by the processing unit, performing acts including:
receiving, at a first system and from a second system unauthorized by the first system, a request for operating a resource of the first system;
in response to an authorization chain being detected based on a first record, authorizing the operation of the resource of the first system, the authorization chain including at least a third system that authorizes the second system and is authorized by the first system, the first record at least indicating one or more systems that are authorized by the first system to operate resources of the first system wherein a record associated with the authorization chain is updated, based on a user input, creating a dynamic authorization relationship.

15. The device of claim 14, wherein the acts further comprise causing the authorization chain to be detected by:
receiving, from the second system, an identification of the third system;
determining whether the third system is authorized by the first system by searching the identification of the third system in the first record;
in response to determining that the third system is authorized by the first system, detecting whether the second system is authorized by the third system.

16. The device of claim 14, wherein the acts further comprise causing the authorization chain to be detected by:
obtaining, from the first record, a system authorized by the first system as the third system; and
detecting whether the second system is authorized by the third system.

17. The device of claim 14, wherein the acts further comprise causing the authorization chain to be detected by:
sending to the third system an inquiry to determine whether the second system is authorized by the third system; and
receiving from the third system a response to the inquiry, the response indicating whether the second system is authorized by the third system.

18. The device of claim 14, wherein the first record includes authorization information indicating further one or more systems authorized by the one or more systems that are authorized by the first system, the acts further comprising causing the authorization chain to be detected by:
searching the first record for first authorization information indicating that the second system is authorized by the third system; and
in response to finding the first authorization information in the first record, determining that the second system is authorized by the third system.

19. The device of claim 14, wherein the first record includes authorization information indicating further one or more systems authorized by the one or more systems that are authorized by the first system, the acts further comprising:
in response to determining that the first record includes second authorization information indicating that the first system is authorized by the third system, causing the second authorization information to be removed from the first record.

20. The device of claim 14, wherein the acts further comprise:
causing the first record to be provided to at least one of the one or more systems that are authorized by the first system.

* * * * *